Jan. 1, 1929.
E. R. KULKA
1,697,602
LOCK NUT DEVICE
Filed May 11, 1927
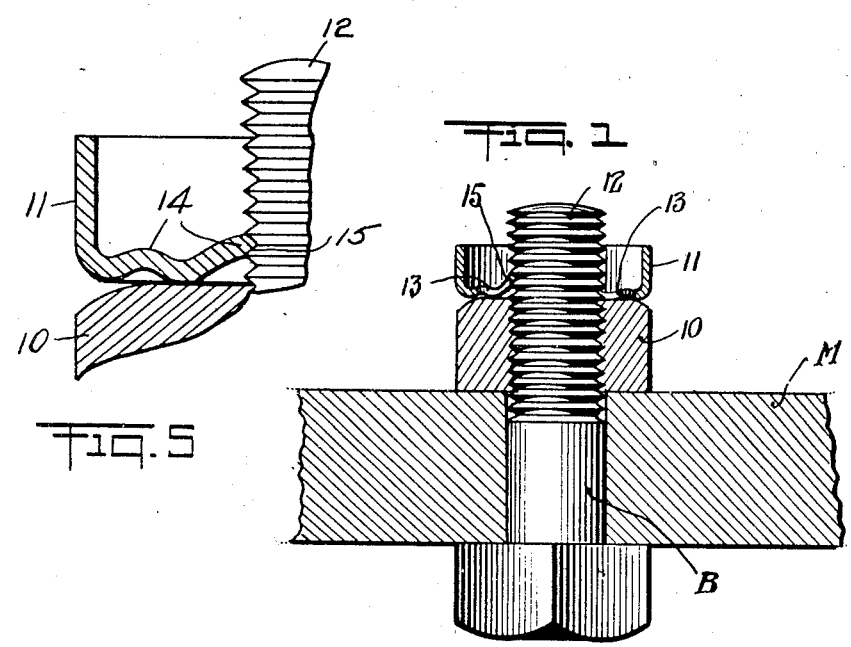
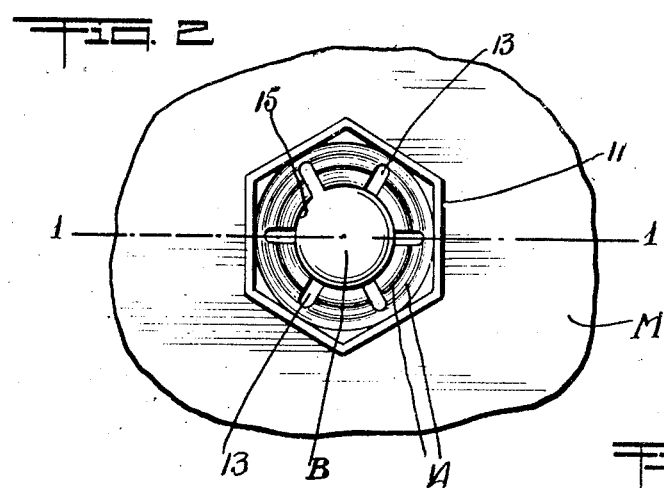
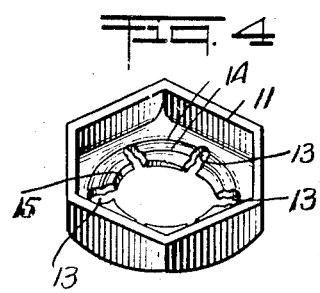
INVENTOR
Eugene R. Kulka
BY
ATTORNEYS Patented Jan. 1, 1929.

1,697,602

UNITED STATES PATENT OFFICE.

EUGENE R. KULKA, OF BROOKLYN, NEW YORK, ASSIGNOR TO C. D. WOOD ELECTRIC CO. INC., OF NEW YORK, N. Y., A CORPORATION OF NEW YORK.

LOCK-NUT DEVICE.

Application filed May 11, 1927. Serial No. 190,495.

My invention relates to a new and improved form of lock nut construction.

One of the objects of my invention is to provide a lock nut of extremely simple construction and which can be made at a minimum cost.

Another object of my invention is to provide a lock nut which can be readily forced into the locking position and which can be readily forced away from the unlocking position.

Another object of my invention is to provide a lock nut which will not require any internally threaded parts.

Other objects of my invention will be set forth in the following description and drawings which illustrate a preferred embodiment thereof, it being understood that the above general statement of the objects of my invention is intended merely to generally explain the same, and not to limit it in any manner.

Fig. 1 is a sectional view partially in elevation showing the lock nut in the locking position, this figure being a section on the line 1—1 of Fig. 2.

Fig. 2 is a top view of the device shown in Fig. 1.

Fig. 3 is a side elevation of the lock nut.

Fig. 4 is a perspective view of the lock nut.

Fig. 5 is an enlarged detail view showing the configuration of the locking tongues.

The drawings show a bolt B having a threaded end 12, which is applied to any suitable member M. The bolt B is held in position by means of an ordinary nut 10. The lock nut 11 comprises a cup-shaped member which can be made from any suitable metal either by a stamping operation or by any other method. The member 11 is provided with a central opening and with a series of tongues 14 which are separated by openings 13. The said tongues 14 are provided with upwardly bent inner ends 15. The inner ends of said tongues 14 are not located in the same horizontal plane. On the contrary, said tongues are, stamped so as to generally follow the contour of the threading at the end of the bolt. In other words, the inner ends of the tongues 14 which engage the threading 12, may be considered as forming part of a helical line which corresponds in pitch and contour to the internal threading of the nut 10, for example. Hence, the lock nut 11 can be turned upon the threaded end 12 of the bolt B so as to be screwed down upon the outer lateral surface of the nut 10, exactly as though the member 11 were provided with an internal threading which could engage the external threading of the bolt B. I prefer to make member 11 of pack hardened cold rolled steel.

The tongues 14 are resilient so that when the member 11 is turned with sufficient force, the tongues 14 engage the outer lateral surface of the nut 10 which causes the said tongues to be flattened. As can be seen in Fig. 1 the said tongues 14 each consist of an outer concave or base portion and of an inner and upwardly curved engaging portion so that each of the said tongues has a double curvature. Hence, when the said tongues 14 are flattened out their ends 15 engage the threading 12 with considerable force so that the said tongues secure a firm frictional grip against the outer lateral surface of the nut 10 and also against the threading of the bolt B. This firm frictional grip prevents the turning of the members 11 in the reverse direction, when the bolt is subjected to jars or the like. Assuming that the parts are held in the vertical position shown in Fig. 1, when the bottom of the lock member 11 contacts with the top of the nut 10, the lock member 11 can be then turned for a short distance while the inner ends of the tongues 14 are depressed because they follow the helical threading 12. This downward pressure upon the inner ends of the tongues 14 causes them to buckle downwardly. However, this buckling tendency is minimized because the tongues have concave bases whose outer and inner ends are substantially in a plane which is perpendicular to the axis of the bolt. Hence, the buckling tendency of the inner free ends of the tongues is much less than if said tongues consisted of straight line members for example, connected to the bottom of the locking member 11.

In addition, the pressure of the concave bases of the tongues 14 upon the top of the nut 11 tends to cause said concave bases to flatten so that the upwardly curved inner ends of the tongues 14 are forced against the threading 12. The stiffness of the relatively short curved inner free ends of the tongues, combined with the additional pressure produced by the flattening of their bases, causes the said tongues to engage the threading with great force.

As shown in Fig. 4, the tongues 14 are thick and stiff, and they have bevelled inner edges which correspond to the shape of the thread of the bolt. Hence a firm frictional grip upon the thread of the bolt is secured. The device could be used as a nut without departing from my invention. When the device is in position the lowest tongue 14 abuts the top of the nut, and is wedged against the nut. While I have shown tongues having a special contour as the preferred embodiment of my invention, my invention also extends to straight tongues and is not limited to such special contour, save as limited in the claims. It will be noted that the tongues are made of substantially rigid material, that is, they are deformed so little when the device is locked in position, that the device can be released by turning it in the opposite direction.

However, the member 11 can be readily removed at any time by applying sufficient force thereto. As is clearly shown in Fig. 5, the inner end of each tongue enters the thread and is free to be thrust towards the base of said thread when the member is urged to the locking position. This is because the downwardly directed edge of the inner end of the tongue does not make an angle with respect to the vertical axis of the bolt which exceeds the angle made by the adjacent downwardly directed wall of the thread. Hence, the movement of the inner engaging end of each tongue is unobstructed by the edge of the adjacent wall of the thread so that said inner end is free to thrust radially. If the angle made by the engaging end of the tongue, with the axis of the bolt, were greater than the angle made by the wall of the thread with the axis of the bolt, then the entering end of the tongue could only thrust substantially perpendicularly against one of the walls of the thread, and it could not be stressed towards the base of the thread.

It is obvious that the device 11 can be made at a minimum cost and by means of suitable dies.

I have shown a preferred embodiment of my invention, but it is clear that numerous changes and omissions could be made without departing from its spirit.

I claim:—

1. A locking member having an exterior annular portion whose inner wall is provided with a plurality of inwardly extending tongues adapted to normally engage the threading of a bolt, the outer base portions of said tongues comprising an arched surface the ends of which contact with the adjacent surface of the member to be locked relatively to the bolt, so that when pressure is applied on said member said tongues are inwardly extended, said base portions of said tongues being substantially in the same plane so that they are simultaneously extended when pressure is applied to said member.

2. An annular locking member having a series of associated tongues whose inner edges are separated from each other, the inner edges of said tongues extending above the base of the said locking member, the outline of said inner edges conforming substantially to a helical line, the inner portions of said tongues being inclined with respect to the outer portions thereof, the inner ends of said tongues being inclined and shaped to normally enter and engage the thread of the bolt.

3. A locking member having an exterior annular portion whose inner wall is provided with a plurality of inwardly extending tongues adapted to engage the threading of a bolt, said tongues being arched between their inner ends and their outer ends, the inner ends of said tongues being inclined and shaped to normally enter and engage the thread of the bolt.

4. A nut-locking member comprising an annular body of substantially rigid material the base portion of which is formed with a bolt receiving opening, tongues made of substantially rigid material and disposed about said opening, said tongues having different inclinations to the axis of said bolt to bring their extremities into a helical line, the inner tips of said tongues being chamfered to normally conform to the thread of said bolt, so that said tips can enter and engage said thread along a substantial bearing surface to insure firm frictional contact.

5. A nut-locking member comprising an annular body of substantially rigid material the base of which is formed with a bolt-receiving opening, tongues made of substantially rigid material, the inner edges of said tongues conforming to a helical line corresponding to the pitch of the thread of the bolt, the said tongues comprising arched surfaces, said inner edges being shaped to conform to the thread of the bolt, so that said inner edges can contact with said thread along a substantial bearing surface to insure firm frictional contact.

6. A nut-locking member comprising an annular body of substantially rigid material the base portion of which is formed with a bolt-receiving opening, and tongues disposed about said opening, said tongues having helically disposed inner ends adapted to engage the thread of the bolt, with one tongue having its inner end inclined and shaped to stress against a nut on the bolt and to seat in the thread of said bolt to frictionally engage the said thread without substantially distorting said thread, said inner end being shaped to have a substantial bearing surface against the said thread, to insure a firm frictional engagement against a force tending to loosen the said member.

7. A locking member comprising an annular body of substantially rigid material the base portion of which is formed with a bolt-receiving opening, said opening having guide means adapted to guide the movement of said member upon the thread of a bolt located in said opening, said guide means including a tongue having an inner end adapted to enter and frictionally engage the threads of the bolt without substantially distorting said thread when the base of said member abuts the article to which the bolt is to be locked, that portion of the inner end of said tongue which enters and frictionally engages the thread of the bolt, when said member is forced to the locking position, being inclined and shaped so that it is adapted to then thrust toward the base of the adjacent portion of said thread along a line which is unobstructed by the edge of said adjacent portion of the thread.

In testimony whereof I affix my signature.

EUGENE R. KULKA.